(12) United States Patent
Takemoto et al.

(10) Patent No.: US 7,820,084 B2
(45) Date of Patent: Oct. 26, 2010

(54) MINUTE SHAPE MOLDING METHOD AND APPARATUS THEREOF

(75) Inventors: Atsushi Takemoto, Gotenba (JP); Jun Koike, Sunto-gun (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 27 days.

(21) Appl. No.: 12/265,073

(22) Filed: Nov. 5, 2008

(65) Prior Publication Data

US 2009/0115107 A1    May 7, 2009

(30) Foreign Application Priority Data

Nov. 6, 2007    (JP)    ............................... 2007-288853

(51) Int. Cl.
*B29C 45/04*    (2006.01)
(52) U.S. Cl. ................. 264/39; 264/328.7; 264/328.11; 264/328.16; 264/DIG. 65; 425/547; 425/548; 425/574; 425/575; 425/576; 425/590
(58) Field of Classification Search ............ 264/328.16, 264/328.11, 328.7, 39, DIG. 65; 425/237, 425/233, 547, 548, 574, 575, 576, 590
See application file for complete search history.

(56) References Cited

U.S. PATENT DOCUMENTS

| | | | | |
|---|---|---|---|---|
| 3,671,621 A | * | 6/1972 | Fukuoka et al. ............. | 264/244 |
| 3,830,613 A | * | 8/1974 | Aoki ........................... | 425/575 |
| 3,906,066 A | * | 9/1975 | Barrie ........................ | 264/45.5 |
| 5,750,068 A | * | 5/1998 | Gouda et al. ................ | 264/572 |
| 5,855,935 A | * | 1/1999 | Brent et al. ................. | 425/574 |
| 6,495,091 B1 | * | 12/2002 | Manson et al. .............. | 264/572 |
| 7,198,480 B2 | * | 4/2007 | Imai ............................ | 425/556 |
| 2007/0284074 A1 | * | 12/2007 | Morooka et al. ............ | 164/122 |

FOREIGN PATENT DOCUMENTS

| | | | |
|---|---|---|---|
| JP | 05-008267 | | 1/1993 |
| JP | 05329901 A | * | 12/1993 |

OTHER PUBLICATIONS

English translation of JP 05329901, retrieved from JPO database Jan. 26, 2010.*
English language translation of JP-05-008267.

* cited by examiner

*Primary Examiner*—Joseph S Del Sole
*Assistant Examiner*—Timothy Kennedy
(74) *Attorney, Agent, or Firm*—DLA Piper LLP US

(57) ABSTRACT

A method of molding a minute shape, in which at least one of a pair of dies is provided with an uneven section of a minute shape on a molding surface thereof, clamping of the pair of dies is stopped immediately before the dies are completely clamped, a resin is injected into a cavity, and thereafter the dies are completely clamped to thereby transcribe the shape of the uneven section onto the resin includes preparing a plurality of transcription dies each provided with the uneven section on a molding surface thereof, heating one of the transcription dies which is not used to mold a product by a heating unit, and exchanging the transcription dies with each other, at a point in time at which molding is completed, to thereby mold the product continuously.

4 Claims, 5 Drawing Sheets

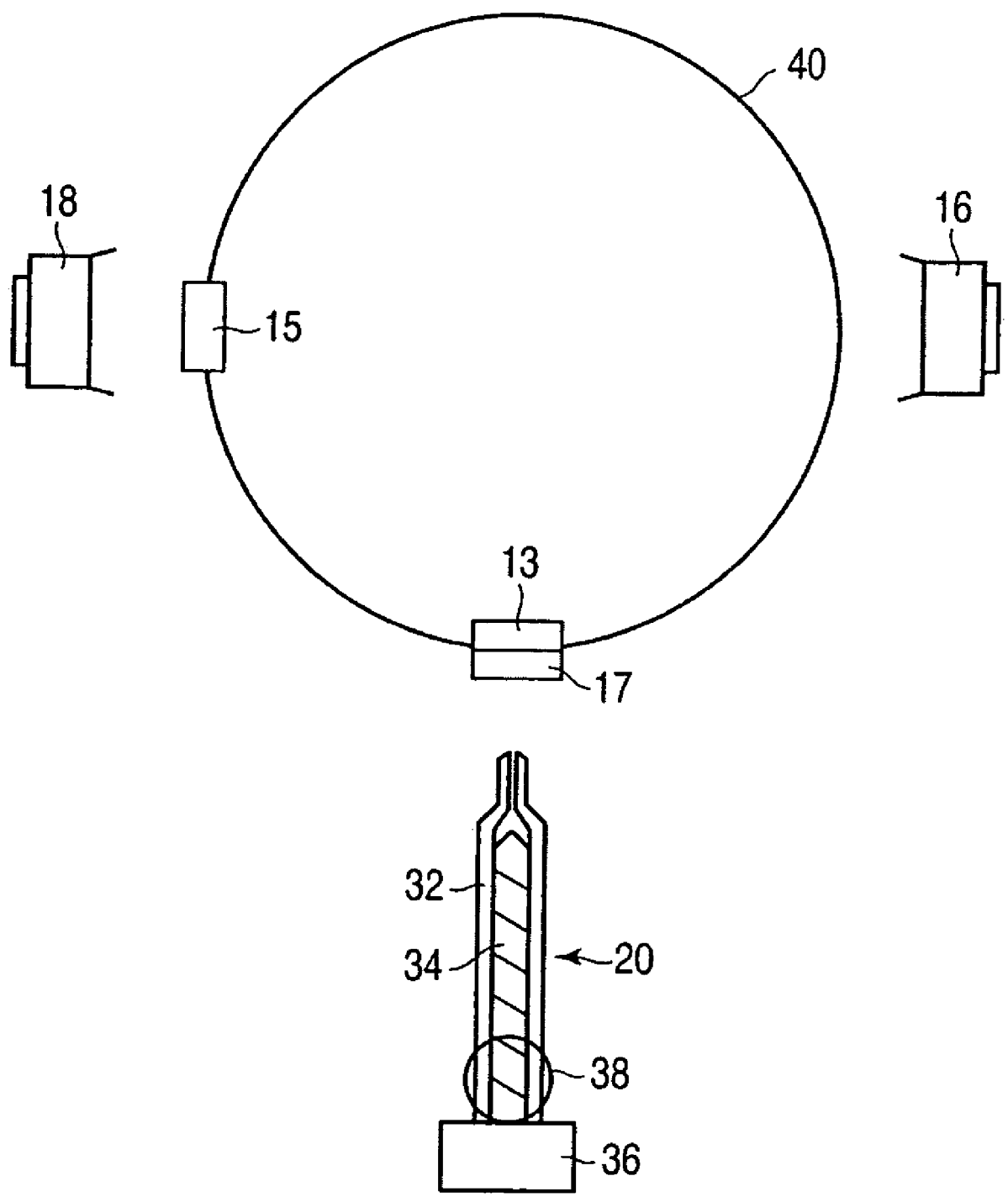
F I G. 10

MINUTE SHAPE MOLDING METHOD AND APPARATUS THEREOF

CROSS-REFERENCE TO RELATED APPLICATIONS

This application is based upon and claims the benefit of priority from prior Japanese Patent Application No. 2007-288853, filed Nov. 6, 2007, the entire contents of which are incorporated herein by reference.

BACKGROUND OF THE INVENTION

1. Field of the Invention

The present invention relates to a method of molding a minute shape by injection molding, and an apparatus thereof.

2. Description of the Related Art

A method of molding a product having a minute uneven shape on the surface, such as an optical component by using a die has been used in recent years. However, in order to mold a product along a minute uneven shape formed on the molding surface of a die, it is necessary to inject a resin into the inside of the cavity of the die at high pressure. Therefore, a molding method is known in which the clamping operation of the die is stopped directly before the die is completely clamped, the resin is injected into the inside of the die at this stage, and thereafter the die is completely clamped to thereby mold the resin into a form in accordance with the minute uneven shape of the die. (for example, see Jpn. Pat. Appln. KOKAI Publication No. 5-8267)

According to this minute shape molding method, even when the resin injected into the cavity of the die does not spread over the cavity accurately along the minute uneven shape, it is possible to make the resin spread to the inner part of the minute uneven shape, and accurately transcribe the minute uneven shape to the product by clamping the die and by the clamping force.

However, in the molding method described above, there has been a problem that after the resin is injected into the die, the die is clamped again, and thus the molding time of the product becomes long. Further, in order to form a minute uneven shape, it is necessary to accurately set the temperature of the die, and thus the time required to heat the die that has been cooled to solidify the product to a predetermined temperature for the next molding has been long. That is, it is not desirable to heat the die partially to a high temperature in order to raise the temperature of the die within a short time. Heating of the die should be such that predetermined temperature distribution is obtained in its entirety. The molding time of the product has been long partially because of the necessity for such heating.

BRIEF SUMMARY OF THE INVENTION

An object of the present invention is to solve the problem described above, and provide a minute shape molding method by which a molding cycle of the product can be shortened, and the minute shape can be accurately molded in a molding method in which after a resin is injected, die clamping is performed again, and an apparatus thereof.

A method of molding a minute shape, in which at least one of a pair of dies arranged to be opposed to each other is a die (hereinafter referred to as a "transcription die") provided with an uneven section of a minute shape on a molding surface thereof, clamping of the pair of dies is stopped immediately before the dies are completely clamped by a clamping mechanism, a resin is injected into a cavity formed by the pair of dies, and thereafter the dies are completely clamped to thereby transcribe the shape of the uneven section onto the resin, comprises: preparing a plurality of transcription dies; heating, while a product is molded by using one of the transcription dies, the other of the transcription dies by means of a heating unit; transferring, after the product is molded, at least the transcription die of the pair of dies to a heating unit; transferring, at the same time, the other transcription die heated by means of the heating unit to the clamping mechanism; and molding a product by using the other transcription die.

When the paired die is opened by the clamping mechanism, and the product is removed from the die, the die provided with the uneven section of the minute shape on the molding surface thereof, i.e., the transcription die is transferred to the heating unit, and the other of the transcription dies which has been heated to a predetermined temperature state by the heating unit is transferred to the clamping mechanism. As a result of this, it is possible, in the clamping mechanism, to combine a pair of dies by using the heated transcription die, and inject a resin into the cavity to thereby perform a molding process of the next product immediately.

Accordingly, it is possible to shorten the time required to raise the die temperature to a predetermined temperature state necessary for molding and, even by the molding method in which clamping of the die is performed twice, it is possible to shorten the molding cycle of the product. The transcription die is heated by the heating unit, and hence it is possible to heat the die efficiently and in an accurate temperature state, and mold a product having a minute uneven shape with a high degree of accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is another plan view showing an embodiment of a molding equipment according to the present invention.

DETAILED DESCRIPTION OF THE INVENTION

Figure 1:
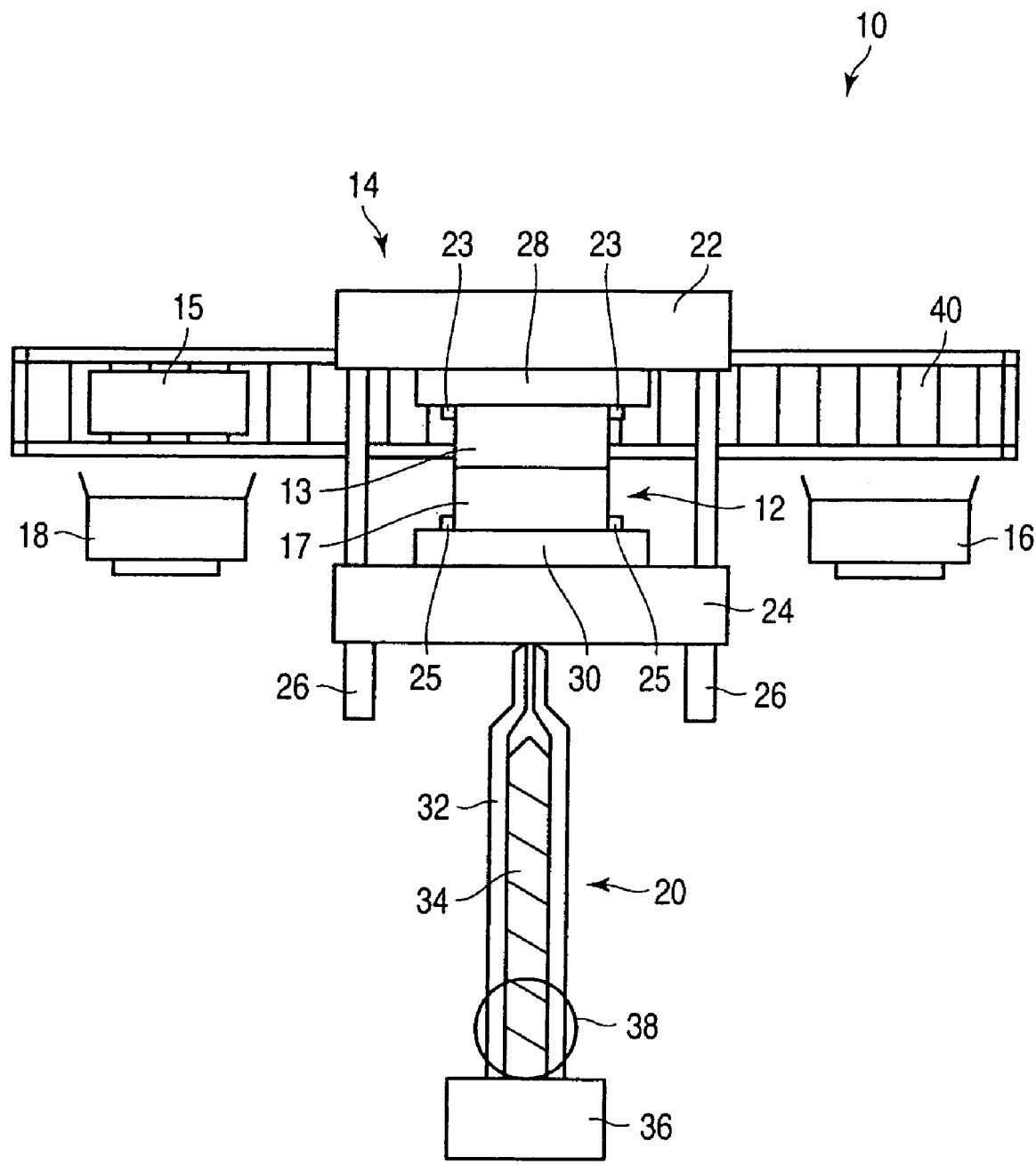
FIG. 1 is a plan view showing an embodiment of a molding equipment according to the present invention.

An embodiment of a molding equipment according to the present invention will be described below with reference to the accompanying drawings. The molding equipment 10 is constituted of, as shown in FIG. 1, a die 12, a clamping mechanism 14, heating units 16 and 18 provided on both sides of the clamping mechanism 14, an injection mechanism 20, and the like. FIG. 1 is a plan view of the molding equipment 10.

The die 12 is constituted of a pair of dies opposed to each other, and is formed of a first die 13 (which is a "transcription die") having an uneven section of a minute shape in the cavity, and a third die 17 to be paired with the first die 13. Further, a second die 15 having the same shape as the first die 13 is positioned on the left side in FIG. 1, and the second die 15 is also paired with the third die 17 to thereby constitute a paired die 12. The uneven section formed on the first die 13 or the second die 15 is a part having a minute shape with a thickness of about several μm to several hundred μm, and is an uneven section for forming, for example, a surface of a diffraction grating.

The clamping mechanism 14 includes a movable side mounting platen 22, and a fixed side mounting platen 24, the movable side mounting platen 22 is provided with fixtures 23 through a cooling base 28, and the fixed side mounting platen 24 is provided with fixtures 25 through a cooling base 30. The fixtures 23 engage the end part of the first die 13 or the second die 15, and detachably fix the first die 13 or the second die 15 to the movable side mounting platen 22. The fixtures 25 engage the end part of the third die 17, and fix the third die 17 to the fixed side mounting platen 24.

Each of the cooling bases 28 and 30 is provided with a coolant path (not shown) in the inner part thereof, and when a coolant is passed through the coolant path, the first die 13 and the like fixed by the fixtures 23 and the like are cooled.

Further, the clamping mechanism 14 is provided with electrically-powered driving cylinders 26 at four corners thereof, drives the movable side mounting platen 22 up and down (actually, horizontally), and moves the first die 13 or the second die 15 with respect to the third die 17. As a result of this, the paired die 12 is appropriately driven to be opened or closed. Incidentally, the driving cylinder 26 may be hydraulically driven.

Further, the clamping mechanism 14 has a function of stopping the movement of the movable side mounting platen 22 immediately before the die 12 is completely closed, and holding the clamping operation in the state immediately before the completely closed state. The gap between the first die 13 and the like and the third die 17 is a value corresponding to the depth or the shape of the minute uneven section formed on the first die 13 and the like. Further, the clamping mechanism 14 drives the movable side mounting platen 22 again from the state where the platen 22 is stopped immediately before the die 12 is completely closed as described above, and closes the die 12 at predetermined pressure.

The injection mechanism 20 includes a barrel 32, a screw 34 provided in the barrel 32, and a drive mechanism 36 for driving the screw 34, and is provided in such a manner that the entire injection mechanism 20 can be brought close to the clamping mechanism 14 or can be separated therefrom by means of a moving mechanism (not shown). The screw 34 is provided in such a manner that it can be rotated around the axis in the barrel 32, and can be reciprocated axially. The drive mechanism 36 rotates the screw 34 around the axis at a predetermined rotational speed inside the barrel 32, and reciprocates the screw 34 axially at a predetermined speed.

The barrel 32 is provided with a hopper 38, the resin material deposited in the hopper 38 is drawn into the barrel 32 by the rotation of the screw 34. When rotated inside the barrel 32, the screw 34 kneads the resin caused to flow into the barrel 32, and the resin is melted by the heat generated concomitantly with the kneading, heating from outside, and the like. Further, when the screw 34 is pressed to be moved forward axially by the drive mechanism 36, the molten resin is injected into the closed die 12 clamped by the clamping mechanism 14 at predetermined pressure and in a desired amount.

Further, the first heating unit 16 is provided on the right side of the clamping mechanism 14, and the second heating unit 18 is provided on the left side thereof. Each of the heating units is constituted of an electric heater, a heating lamp, and the like, is provided with a temperature sensor (not shown), detects the temperature of the first die 13 or the like transferred from the clamping mechanism 14, and heats the first die 13 or the like in such a manner that the first die 13 or the like reaches a predetermined temperature, and is brought into a predetermined temperature state.

Further, while the clamping mechanism 14 molds a product by using the second die 15 and the third die 17, the first heating unit 16 heats the first die 13 to a predetermined temperature condition. Incidentally, the heating means such as the heating unit 16 and the like is not limited to the electric heater or the heating lamp, and the heating method of the heating unit is not particularly limited, i.e., a method in which a heated fluid is passed through the inside, a method in which heating is performed by induction heating, and the like may also be used.

A transfer mechanism 40 is arranged between the clamping mechanism 14 and the first heating unit 16, and between the clamping mechanism 14 and the second heating unit 18. The transfer mechanism 40 reciprocates the first die 13 between the first heating unit 16 and the clamping mechanism 14, and reciprocates the second die 15 between the second heating unit 18 and the clamping mechanism 14. The transfer operation of the first die 13, and the transfer operation of the second die 15 are performed in conjunction with each other, and the first die 13 and the second die 15 are alternately transferred to the clamping mechanism 14. Incidentally, the transfer mechanism 40 is not limited to a mechanism for reciprocating the first die 13 and the like horizontally, and as shown in FIG. 10, may be a mechanism for transferring them rotationally. Further, the method of the transfer mechanism 40 for transferring the first die 13 and the like is not particularly limited.

The third die 17 is a die common to the first die 13 and the second die 15, is fixed to the fixed side mounting platen 24 of the clamping mechanism 24 by means of the fixtures 25 as described above, and the third die 17 and the first die 13, or the third die 17 and the second die 15 constitute the paired die 12.

Next, the function and the operation of the molding equipment 10 will be described below.

Figure 2:
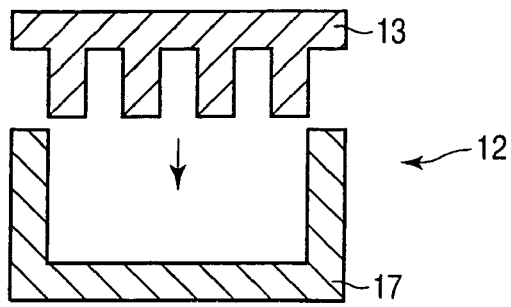
FIG. 2 is a cross-sectional view showing a die according to the present invention.
Figure 3:
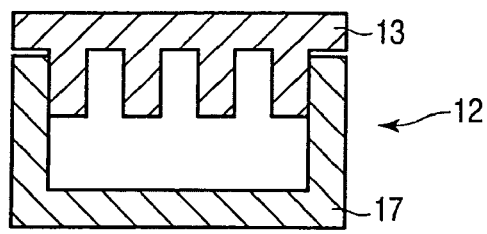
FIG. 3 is a cross-sectional view showing the die shown in FIG. 2.

FIG. 2 shows the die 12. The die 12 is a paired die constituted of a combination of the first die 13 serving as the transcription die, and the third die 17, and is attached to the clamping mechanism 14. When a molding operation is started, the clamping mechanism 14 drives the movable side mounting platen 22, and closes the die 12. However, immediately before the die 12 is completely closed, the clamping mechanism 14 stops the clamping operation of the movable side mounting platen 22 as shown in FIG. 3.

Figure 4:
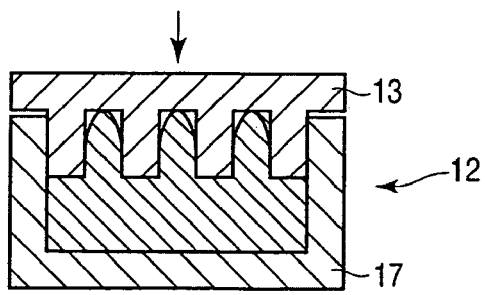
FIG. 4 is a cross-sectional view showing the die shown in FIG. 2.

In this state, the screw 34 of the injection mechanism 20 is advanced inside the barrel 32, and the resin is injected into the cavity of the die 12. The resin is injected into the cavity in such a manner that the amount of the resin is sufficient for the resin to spread over the entire cavity, and is filled into the cavity of the die 12. However, it is taken into consideration that the resin injected into the die from the injection mechanism 20 does not completely flow into every corner of the uneven section having the minute shape in some cases as shown in FIG. 4.

Figure 5:
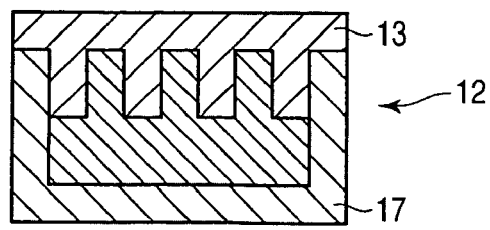
FIG. 5 is a cross-sectional view showing the die shown in FIG. 2.

Further, at the stage in which injection of the resin by the injection mechanism 20 is completed, and the resin is still soft, the clamping mechanism 14 is driven again to completely close the die 12 as shown in FIG. 5. Then, the resin is subjected to high pressure by the clamping of the die 12, and the resin is accurately squeezed into every corner in the minute uneven section formed on the first die 13 as shown in FIG. 5.

Figure 6:
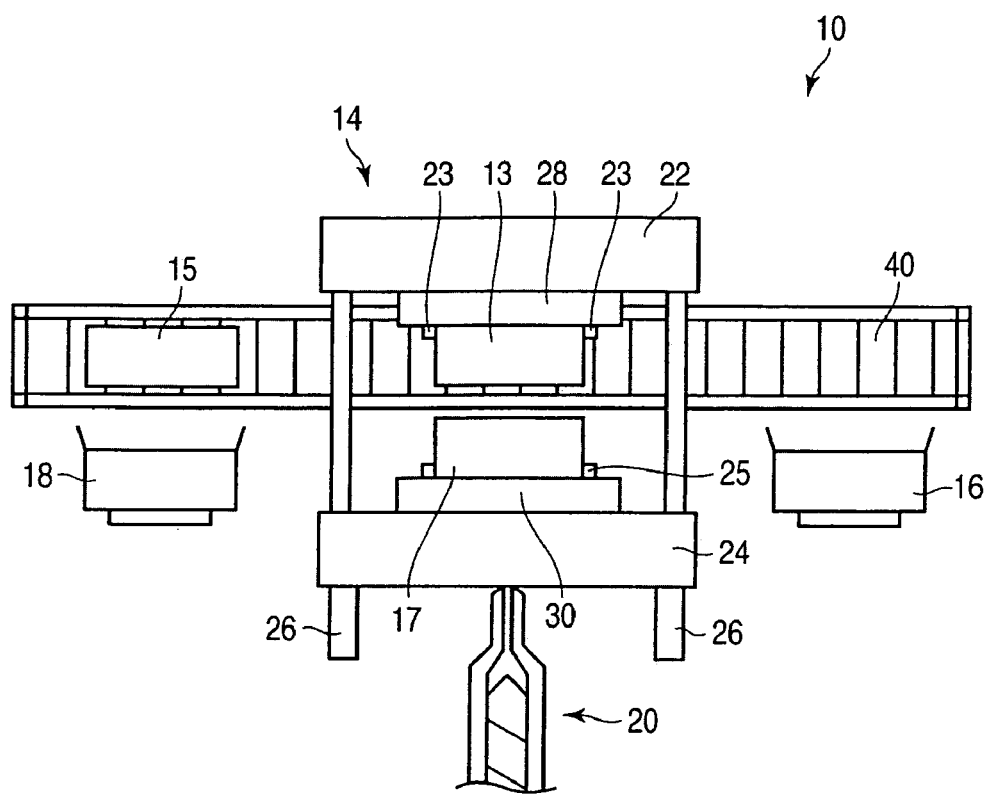
FIG. 6 is a plan view for explaining an operation of the molding equipment shown in FIG. 1.

Then, the coolant is passed through the coolant paths of the cooling bases 28 and 30, and the die 12 is cooled to a predetermined temperature. When the die 12 is cooled, the clamping mechanism 14 drives the driving cylinders 26 to move the movable side mounting platen 22. Then, the die 12 is opened as shown in FIG. 6, and the product is removed from the die 12.

Figure 7:
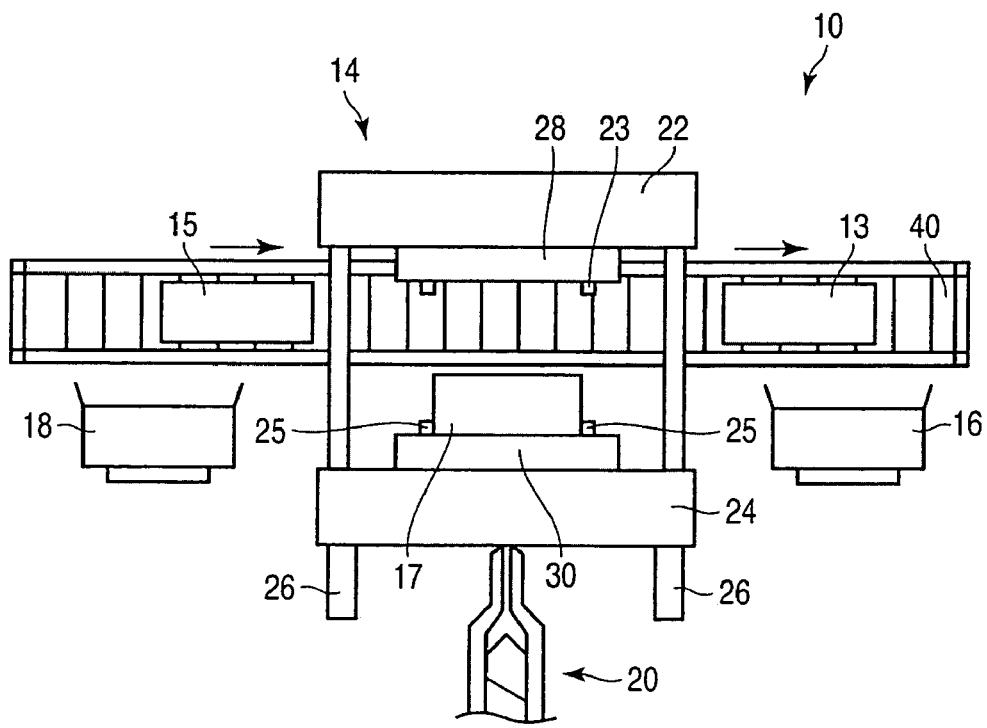
FIG. 7 is a plan view for explaining an operation of the molding equipment shown in FIG. 1.

When the product is removed from the die 12, the clamping mechanism 14 then operates the fixtures 23, and thus the first die 13 is detached from the movable side mounting platen 22. The first die 13 detached from the movable side mounting platen 22 is transferred to the first heating unit 16 by the transfer mechanism 40 as shown in FIG. 7.

Figure 8:
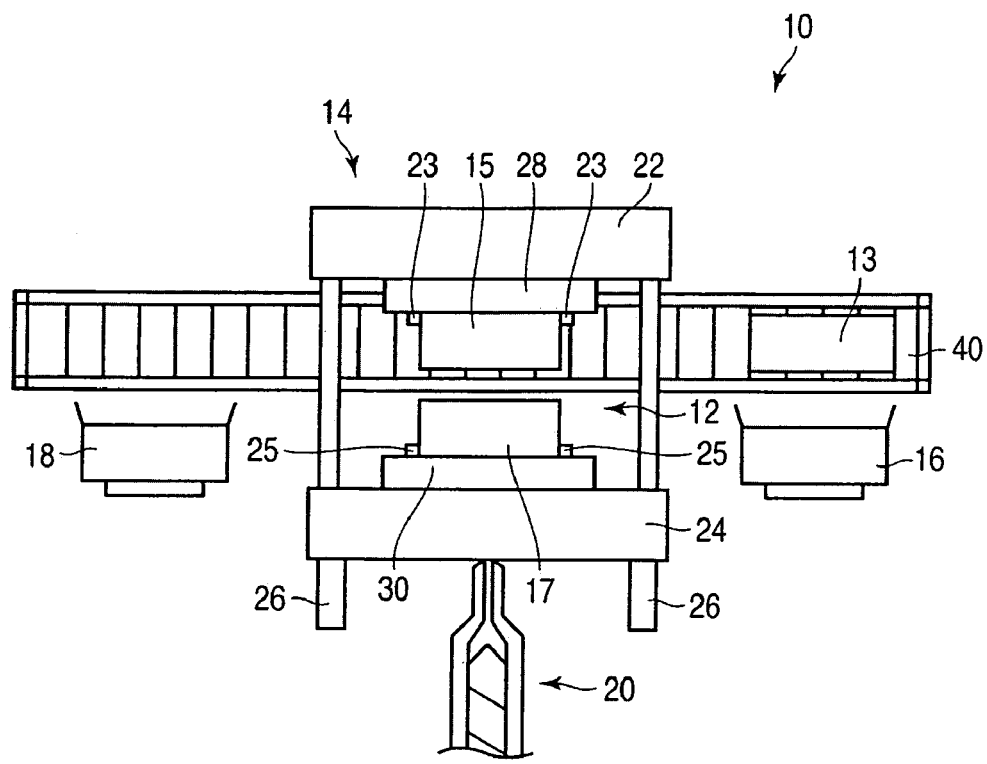
FIG. 8 is a plan view for explaining an operation of the molding equipment shown in FIG. 1.
Figure 9:
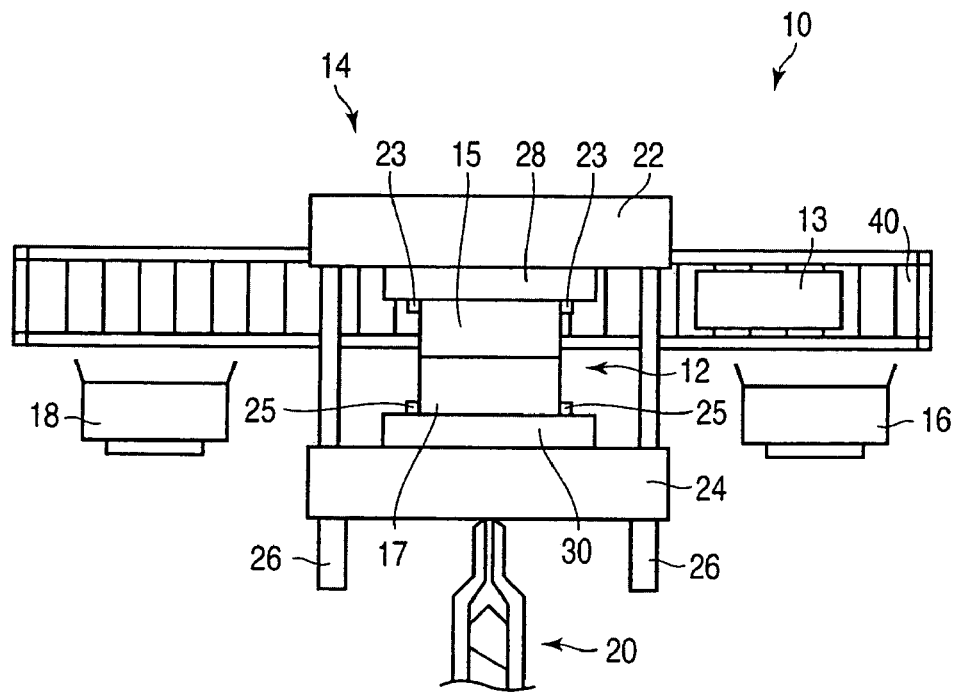
FIG. 9 is a plan view for explaining an operation of the molding equipment shown in FIG. 1.

Further, substantially at the same time when the first die 13 is transferred to the first heating unit 16, the second die 15 that had been transferred to the second heating unit 18 is transferred to the clamping mechanism 14 by the transfer mechanism 40 as shown in FIG. 8. The second die 15 that has been transferred to the clamping mechanism 14 is fixed to the movable side mounting platen 22 by means of the fixtures 23, and the movable side mounting platen 22 is driven as shown in FIG. 9, thereby closing the second die 15 and the third die 17 as the paired die 12. The second die 15 is already heated to the predetermined temperature state by the second heating unit 18, and hence, as soon as the second die 15 is fixed to the movable side mounting platen 22, the molding operation of the product can be performed.

On the other hand, while the product is molded using the second die 15 as described above, the first die 13 in which molding of the product is already completed is heated to the predetermined temperature state by the first heating unit 16. The first heating unit 16 heats the first die 13 to the predetermined temperature state before the die 12 formed by the combination of the second die 15 and the third die 17 molds the product. Further, when the second die 15 is cooled, and the product is removed, the second die 15 is transferred to the second heating unit 18, and substantially at the same time, the first die 13 is transferred from the first heating unit 16 to the clamping mechanism 14.

Further, the clamping mechanism 14 forms the die 12 again by combining the first die 13 transferred thereto from the first heating unit 16, and the third die 17 with each other, and injects the resin from the injection mechanism 20 into the cavity of the die 12 to perform molding of the next product. The first die 13 is already heated to the predetermined temperature state by the first heating unit 16, and hence, molding of the product is immediately performed by the same step as described above. In this way, molding is performed repeatedly.

Incidentally, the third die 17 is heated by an ordinary heating method. For example, the third die 17 is heated by passing a heated fluid through the cooling base 30 or by other method. This is because, the cavity of the third die 17 has no minute uneven shape, e.g., a flat surface, and it is possible to cope with the heating of the third die 17 by the conventional heating method in many cases. When a minute uneven section is also provided in the cavity of the third die 17, the third die 17 may be transferred to the heating unit as in the case of the first die 13 and the like to be subjected to heating.

Accordingly, even when the resin injected into the cavity does not spread to the corners of the uneven section, after the resin is injected into the cavity of the die 12, clamping of the die 12 is performed again, and hence, high pressure is applied to the resin by the second clamping operation, the resin is squeezed into gaps, and the minute uneven shape can be formed on the surface of the product.

Further, while molding is performed by using one of the first die 13 and the second die 15, the other die is heated by the first heating unit 16 or the second heating unit 18, and hence, it is possible, even by the manufacturing method in which clamping of the die 12 is stopped immediately before the die 12 is completely clamped and, after the resin is injected into the die 12, clamping is performed again, to, after the molding of the product is completed, exchange the first die 13 and the second die 15 with each other, immediately mold the product, and shorten the molding time of the product.

Further, the dies are individually heated, for example, the first die 13 or the like is heated by the first heating unit 16, and hence the heating unit can be set in accordance with the die, and the first die 13 or the like can be heated to the predetermined temperature state within a short time, and accurately. This makes it possible to mold a product having a minute shape accurately.

Incidentally, in the molding equipment 10, when the clamping mechanism 14 performs the second clamping, air inside the die 12 may be removed by using a suction unit or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of molding a minute shape, in which at least one of a pair of dies arranged to be opposed to each other is a transcription die provided with an uneven section of a minute shape for molding a product on a molding surface thereof, and the other die is a fixed die arranged opposed to the transcription die, comprising:

preparing a first transcription die and a second transcription die that are each detachably fixable to a movable side mounting platen provided with a cooling base, and one fixed die that is fixed to a fixed side mounting platen;

partially clamping the first transcription die to the fixed die;

injecting a resin into a cavity formed by the first transcription die and the fixed die; thereafter, completing clamping of the first transcription die and the fixed die;

heating the second transcription die with a heating unit, while a product is molded by using the first transcription die and the and the fixed die;

transferring, after the product is molded, the first transcription die to a heating unit;

transferring, at the same time, the second transcription heated by the heating unit to the clamping mechanism; and molding a product by using the second transcription die and the fixed die by partially clamping the second transcription die to the fixed die, injecting a resin into a cavity formed by the second transcription die and the fixed die and thereafter, completing clamping of the second transcription die and the fixed die.

2. A minute shape molding equipment, in which at least one of a pair of dies arranged to be opposed to each other is a die transcription provided with an uneven section of a minute shape for molding a product on a molding surface thereof, and the other die is a fixed die arranged opposed to the transcription die, clamping of the pair of dies is stopped immediately before the dies are completely clamped by a clamping mechanism, a resin is injected into a cavity formed by the pair of dies, and thereafter the dies are completely clamped to thereby transcribe the shape of the uneven section onto the resin, comprising:

- a clamping mechanism configured to clamp the pair of dies, the clamping mechanism having a movable side mounting platen and a fixed side mounting platen;
- a cooling base provided on the movable side mounting platen;
- an injection mechanism configured to inject a resin into a cavity of the pair of dies;
- a first transcription die and a second transcription die that are each detachably fixable to the movable side mounting platen;
- one fixed die that is fixed to the fixed side mounting platen;
- at least one heating unit configured to heat a transcription die; and
- a transfer mechanism configured to transfer the first transcription die from the movable side mounting platen to the at least one heating unit after a product has been molded using the first transcription die and the fixed die, and configured to transfer the second transcription die heated to a predetermined temperature condition by the at least one heating unit to the movable side mounting platen of the clamping mechanism.

3. The minute shape molding equipment according to claim 2, wherein a first heating unit is on a first side of the clamping mechanism and a second heating unit is on a second side of the clamping mechanism, the second transcription die is heated by the second heating unit when the first transcription die is molding a product with the fixed die, and the transfer mechanism is configured to transfer the first transcription die from the movable side mounting platen to the first heating unit after a product has been molded using the first transcription die and the fixed die and cooled by the cooling base, and to transfer the second transcription die from the second heating unit to the movable side mounting platen of the clamping mechanism.

4. The minute shape molding equipment according to claim 2, wherein the transfer mechanism comprises a rotational member that attaches to each transcription die, and the transcription dies are alternately transferred to and from the clamping mechanism and the at least one heating unit by the rotation of the rotational member.

* * * * *